United States Patent
Stensborg et al.

(10) Patent No.: US 11,029,647 B2
(45) Date of Patent: Jun. 8, 2021

(54) METHOD OF METALLISING OPTICAL ELEMENTS COMPRISING SURFACE RELIEF STRUCTURES

(71) Applicant: STENSBORG A/S, Roskilde (DK)

(72) Inventors: Fagerbo Jan Stensborg, Sjællands Odde (DK); Leif Yde, Lyngby (DK); Lars Lindvold, Kokkedal (DK); Christian Elbek, Virum (DK); Anders Albertsen, Roskilde (DK)

(73) Assignee: STENSBORG A/S, Roskilde (DK)

( * ) Notice: Subject to any disclaimer, the term of this patent is extended or adjusted under 35 U.S.C. 154(b) by 238 days.

(21) Appl. No.: 16/305,979

(22) PCT Filed: May 25, 2017

(86) PCT No.: PCT/EP2017/062724
§ 371 (c)(1),
(2) Date: Nov. 30, 2018

(87) PCT Pub. No.: WO2017/207420
PCT Pub. Date: Dec. 7, 2017

(65) Prior Publication Data
US 2019/0212697 A1  Jul. 11, 2019

(30) Foreign Application Priority Data
Jun. 3, 2016  (DK) .................................. 201600327

(51) Int. Cl.
*G03H 1/00* (2006.01)
*G03H 1/02* (2006.01)
(Continued)

(52) U.S. Cl.
CPC ......... *G03H 1/0244* (2013.01); *B42D 25/328* (2014.10); *C09D 11/037* (2013.01);
(Continued)

(58) Field of Classification Search
CPC ............... G03H 1/0244; G03H 1/0256; G03H 2250/36; G03H 2250/34; G03H 2250/42;
(Continued)

(56) References Cited

U.S. PATENT DOCUMENTS 7,396,399 B2 * 7/2008 Lee ........................ C07F 1/005
106/31.47
7,955,528 B2   6/2011 Chung et al.
(Continued)

FOREIGN PATENT DOCUMENTS

WO   2005049745 A1   6/2005

OTHER PUBLICATIONS

Surface tension values, retrieved from www.surface-tension.de, Oct. 20, 2020.*

*Primary Examiner* — Arnel C Lavarias
(74) *Attorney, Agent, or Firm* — IPRO, PLLC (57) ABSTRACT

A method of forming a metallic structure on an optical element including a surface relief structure is disclosed. The method includes: forming a metallic structure on the optical element by applying a metal containing ink to the surface relief structure. The metal-containing ink includes an organic solvent and a metal-containing component. The metal-containing component is a homogeneously soluble metal salt, a metal complex or any combinations thereof.

20 Claims, 3 Drawing Sheets

(51) Int. Cl.
 *C09D 11/037* (2014.01)
 *C09D 11/322* (2014.01)
 *B42D 25/328* (2014.01)

(52) U.S. Cl.
 CPC ......... *C09D 11/322* (2013.01); *G03H 1/0256* (2013.01); *G03H 2250/36* (2013.01)

(58) Field of Classification Search
 CPC ................... G03H 2250/44; B42D 25/328; C09D 11/037; C09D 11/322; C09D 5/004; C09D 5/29; C09D 5/36; C09D 11/033; C09D 5/38
 USPC ........ 359/2, 3, 22, 32, 35; 430/1, 2; 283/72, 283/85, 86; 106/1.05, 1.12, 1.13, 1.14, 106/1.15, 1.18, 1.19, 1.21, 1.22, 1.23, 106/1.24, 1.25, 1.26, 1.27, 1.28
 See application file for complete search history.

(56) References Cited

U.S. PATENT DOCUMENTS

2005/0003135 A1\* 1/2005 Schmidhalter ...... C09B 67/0033
 428/64.8
2006/0119912 A1 6/2006 Kutsch et al.
2007/0070503 A1 3/2007 Boswell et al.

\* cited by examiner

METHOD OF METALLISING OPTICAL ELEMENTS COMPRISING SURFACE RELIEF STRUCTURES

The present invention relates to a method of, and apparatus for, metallising optical elements comprising surface relief structures. More particularly, the present invention relates to a method of, and apparatus for, metallising optical elements comprising surface relief structures using metallic inks comprising metallic salts, metallic complexes and/or nanoparticles.

The art of metallising surface relief structures is well-known in the field of optically variable devices, for example, banknotes and credit cards. In both cases, the process is based on an off-line process where the whole surface of the structured foil is metallised. In many cases/applications this metallised foil containing diffractive surface relief structures is subsequently partially de-metallised by chemical means. It will be appreciated that such a process is time-consuming and generates considerable waste.

Other methods for enhancing the diffraction efficiency of a surface relief grating include variations of depositing a layer or layers of transparent dielectrics with high index of refraction typically made from refractory materials such as, for example: $TiO_2$, $HfO_2$, $ZrO_2$, $Ta_2O_5$ and ZnS. All these substances typically have index of refraction in the region 2.0-2.3. Most of these materials are used in security printing on polymers foils which have been coated by various vacuum deposition methods prior or after an embossing or moulding process Therefore, there is a technical problem in the art that such known methods for high-quality metallisation of optical elements comprising surface relief structures are limited in production throughput and flexibility of manufacture. The present invention addresses, in one aspect, the above issues.

According to a first aspect of the present invention, there is provided a method of forming a metallic structure on an optical element comprising a surface relief structure, the method comprising: applying a metal-containing ink to said surface relief structure to form said metallic structure, wherein the metal-containing ink comprises one or more organic solvents and one or more of: a homogeneously soluble metal salt; a metal complex; or metallic nanoparticles having a size of less than 50 nm.

In one embodiment, the metal or metal-containing component comprises a metal or metal ion selected from the group of: silver, gold, copper, ruthenium, osmium, iridium, and platinum.

In one embodiment, the metal or metal-containing component comprises silver or a silver ion.

In one embodiment, the or each solvent is selected from the group of: alcohols, esters, ketones, glycol ethers or phenol ethers.

In one embodiment, at least one solvent has a surface tension less than or equal to 25 dyn/cm.

In one embodiment, at least one solvent has a surface tension greater than or equal to 30 dyn/cm.

In one embodiment, said metallic structure has a size in one or more dimensions of between 10 to 500 nm.

In one embodiment, said metallic structure has a size in one or more dimensions of between 20 to 100 nm.

In one embodiment, said metallic structure has a size in one or more dimensions of between 20 to 50 nm.

In one embodiment, said metallic structure has an optical density ≥1.

In one embodiment, said metallic structure has an optical density in the range of 1 to 6.

In one embodiment, said metallic structure has an optical density in the range of 2 to 4.

In one embodiment, the step of applying comprises printing or coating the metal containing ink on to said surface relief structure of said optical component.

In one embodiment, the step of printing comprises one or more of: inline printing, on demand printing, or in-register printing.

In one embodiment, the printing or coating comprises one or more of: dispensing, inkjet printing, aerosol jet, offset printing, screen printing, pad printing, gravure printing, flexography, stencil printing, imprinting, xerography or lithography.

In one embodiment, the surface relief structure comprises a surface structure defining a plurality of peaks and troughs, and wherein the metallic structure completely covers the peaks of said surface relief structure and completely fills the troughs therebetween.

In one embodiment, the surface relief structure comprises a surface structure defining a plurality of peaks and troughs, and wherein the metallic structure defines a conformal coating on the peaks and troughs of said surface relief structure.

In one embodiment, the surface relief structure is partially metallised to define a partially metallised structure having the same pitch as said surface relief structure.

In one embodiment, subsequent to the step of applying, the method further comprises the step of drying said metal-containing ink.

In one embodiment, the step of drying is performed such that the temperature of the applied metal-containing ink is in the temperature range of 80-300° C.

In one embodiment, the step of drying is performed such that the temperature of the applied metal-containing ink is in the temperature range of 120-180° C.

In one embodiment, the step of drying is performed for less than 5 minutes.

In one embodiment, the step of drying is performed for less than 1 minute.

In one embodiment, the method further comprises the step of applying a coating or a foil to the metallic structure.

In one embodiment, the optical element comprises one or more of: a diffractive surface relief structure; a retro-reflective surface relief structure; and a plasmonic surface relief structure.

In one embodiment, the optical element is operable to produce structural colour.

In one embodiment, the optical element comprises an optoelectronic device.

According to a second aspect of the present invention, there is provided an optical element comprising a metallised surface relief structure formed by the method of any one of the preceding claims.

In one embodiment, the optical element comprises one or more of: a diffractive surface relief structure; a retro-reflective surface relief structure; and a plasmonic surface relief structure.

In one embodiment, the optical element is operable to produce structural colour.

In one embodiment, the optical element comprises an optoelectronic device.

According to an aspect of the present invention, there is provided a method to create a metallic nanosize structure upon a surface relief structure by applying a metal containing ink.

In one embodiment, the application method is a printing or coating method used to apply a metal containing ink to create a metallic nanosize structure upon a surface relief.

In one embodiment, the application method is a printing or coating method used to apply a metal containing ink to create a metallic nanosize structure upon a surface relief diffractive structure for enhancement of the phase modulation.

In one embodiment, the printing method is inline, or on demand, or in register or all of the above in combination.

According to an aspect of the present invention, there is provided a metallic nanosize structure, as set forth in any of the preceding claims, comprised of any known metal element.

In one embodiment, the metal containing ink contains a metallic element that is present as either a homogeneously soluble salt, a metal complex or nano particles.

In one embodiment, the metal is silver.

In one embodiment, the metal containing ink is optimized for the proper deposition, wetting, drying and adhesion of said printed surface relief diffractive structure, comprising one or more solvents to obtain desired viscosity, solids loading, stability and drying, wherein there is preferably at least one solvent with a surface tension of less than 25 dyn/cm in combination with at least one other solvent with a surface tension of above 30 dyn/cm.

In one embodiment, the solvents used are either alcohols, esters, ketones, glycol ethers and phenol ethers.

Figure 3:
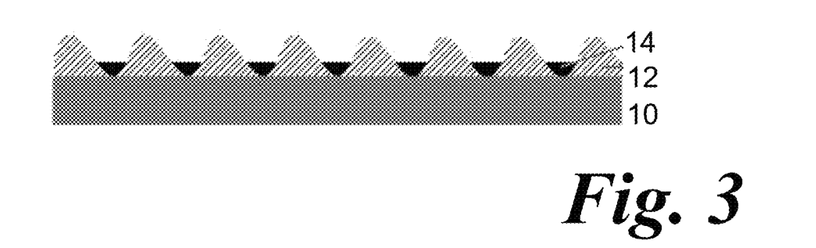

In one embodiment, the said diffractive surface relief structure is fully filled (see drawing 3) by printing with a printing ink where the ink either is comprised partly of a homogeneously soluble metal salt or metal complex or is comprised partly by nanoparticles with a size less than or equal to 50 nm.

In one embodiment, a metallic conformal coating is formed upon said diffractive surface relief structure.

In one embodiment, a metallic deposition is made into said diffractive surface relief structure to obtain a partially metallised structure with the same pitch as said surface relief structure.

In one embodiment, the method is operable to produce metallised structures of a size in one or more dimensions of 10-500 nm, preferably size 20-100 nm and more preferably 20-50 nm in size.

In one embodiment, the method is operable to produce metallised structures of a size in one or more dimensions of 1-500 nm's, preferably size 2-100 nm and more preferably 2-50 nm in size.

In one embodiment, the printing or coating is performed by dispensing, inkjet printing, aerosol jet, offset printing, screen printing, pad printing, gravure printing, flexography, stencil printing, imprinting, xerography or lithography.

In one embodiment, the process of drying said printing ink is done where the temperature of the ink is in the temperature range 80-300° C., preferably in the range of 120-180° C. for less than 5 minutes and preferably for less than 1 min.

In one embodiment, the deposition method is on demand and facilitates on the fly changes such as Inkjet printing.

In one embodiment, the metallic structure is protected by another material covering the metallic structure, such as a coating or a foil.

Embodiments of the present invention will now be described in detail with reference to the accompanying drawings, in which.

In aspects, the invention provides a method of applying any nano- or microstructured surface with a metal coating by a direct additive printing method. It is a further aspect of this invention that the formed metal coating renders the coated nano- or microstructure either highly mirror reflective or with an enhancement of the phase modulation of reflected light or desired colour or desired electrical properties or a combination of the above.

Figure 1:
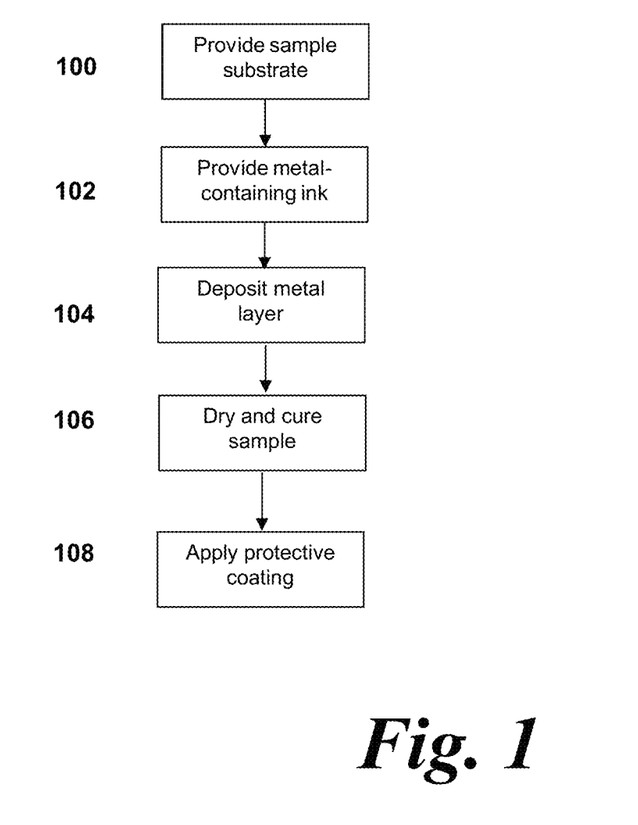
FIG. 1 shows an exemplary method according to an embodiment of the present invention.

A method of operation of the present invention will now be described with reference to FIG. 1. FIG. 1 shows a general flow diagram of a non-limiting embodiment of the invention.

Step 100: Provide Sample Substrate

Embodiments of the invention pertain to enhancing diffractive surface relief structures. Exemplary diffractive surface relief structures may be, for example, used in gratings for spectrometers and optical verification devices such as part of credit cards and banknotes. The diffractive effects of surface relief nano- and microstructures are well-known in the optical community. These structures have great commercial and technical interest as they can be easily replicated for mass-production using various embossing and casting techniques based on either thermosetting or photocurable materials. For example, the HoloPrint® method may be used as set out in EP 1150843 B1. However, the type, form and topology of diffractive surface relief structure, and the method of manufacture, is not material to the present invention and will not be discussed further here.

The method proceeds to step 102.

Step 102: Provide Metal Containing Ink

The inventors of the present invention have surprisingly discovered that a variety of industrial printing methods can be used. In embodiments a specific set of commercial silver-based metallic inks can be used. However, other suitable metals may also be used.

In non-limiting embodiments, these inks are reformulated to obtain the desired properties of the present invention. Nonrestrictive specific examples of printing- and coating methods applicable are: inkjet, gravure, flexo and slot coating.

The inventors have found that the preferred forms of metal-containing ink for the purposes of the present invention comprise either a homogenous liquid where the metal is present as a metal salt or metal complex or where the metal-containing ink is particle-based. The metal salt or metal complex is required to be soluble in one or more organic solvents. Typical examples of suitable metal salts or metal complexes can be found in U.S. Pat. No. 7,955,528. However, non-limiting examples of metals or metal ions suitable for use with the present invention include: silver, gold, copper, ruthenium, osmium, iridium, and platinum. A non-limiting example of a suitable ligand for a metal complex may be Carbamate.

Alternatively, if the metal-containing ink is particle based, then the ink comprises a significant part of particles below 50 nm and preferably below 10 nm, so as to be able to render nano-structures with a conformal continuous coating of 10-100 nm of final metal coating. In non-limiting examples, approximately 50% or more of the particles are below 50 nm in size, and preferably below 10 nm.

For reformulation, a solvent is required to decrease the silver content of the formulation under the requirements of maintaining ink stability and shelf life, printability and film forming characteristics under drying by different methods. Depending on the ink to be reformulated, the printing method (described below) and the drying method (described below) used, adhesion of the printed layer etc, a proper solvent or mixture of solvents can be found. For this purpose, preferred compounds are typical organic solvents used in inks such as alcohols, esters, ketones, glycol ethers and phenol ethers. The reformulation yielded a mixture with a viscosity between 0.5 and 100 cP, preferably between 1 and 50 cP.

The method proceeds to step 104.

Step 104: Deposit Metal Layer

To enhance the diffraction efficiency, a thin metal coating is applied to the grating structure typically by a full covering metal coating. The metal layer increases the refractive index of the surface relief and thereby also the phase modulation. If an extra polymer coating is applied to said metal layer, this extra polymer layer can also serve as protecting layer, e.g. as a protection against counterfeiting.

The metal structure is preferably applied by on demand in-line printing or coating with a metal containing ink as described in step 102 to create a metallic nano-size structure upon a surface relief structure for enhancement of the phase modulation.

In embodiments, it is desired that the metal coating is a conformal and uniformly thin coating to render surface nano-structures intact and with enhanced diffractive properties upon coating. In embodiments, the metal coating may be applied by an industrial printing method to be directly integrated with known continuous web based printing methods.

In embodiments, the printing or coating may comprise one or more of: dispensing, inkjet printing, aerosol jet, offset printing, screen printing, pad printing, gravure printing, flexography, stencil printing, imprinting, xerography or lithography.

The desired effect is to render the said surface relief structure either highly mirror reflective when viewing down on the surface relief structure or with substantial enhancement of the phase modulation of reflected light when viewing through the substrate.

Figure 2:
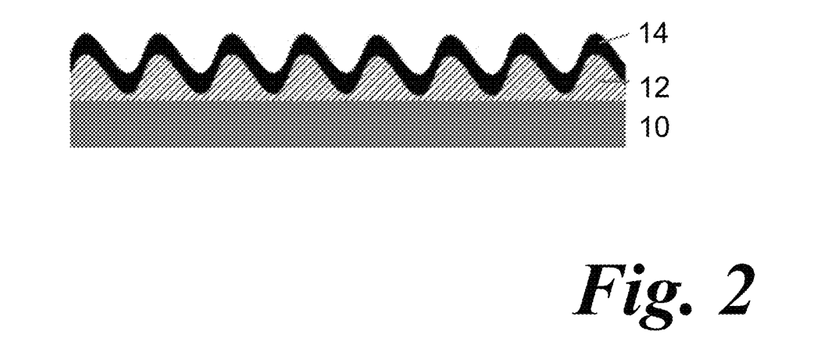
FIGS. 2 to 4 show different variations of optical elements comprising metallised surface relief structures produced in accordance with embodiments of the invention.
Figure 4:
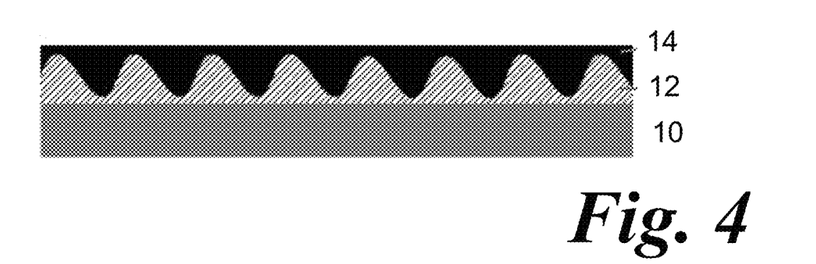

Different configurations may be used as shown in FIGS. 2 to 4. FIGS. 2 to 4 show a substrate 10 holding a surface relief 12 and a metal coating 14. The coating 14 may be conformal (as shown in FIG. 2), partial (as shown in FIG. 3) or fill out the entire grating structure (as shown in FIG. 4).

The method proceeds to step 106.

Step 106: Dry and Cure Sample

In embodiments, the printed metal layer may optionally be dried and/or cured can be done at temperatures between 50° C. and 250° C. and preferably between 100° C. and 200° C. In other embodiments, this may be done at between 80-300° C., and preferably 120-180° C., Preferred timescales of between 1 to 5 minutes may be used.

The method proceeds to step 108.

Step 108: Apply Protective Coating

Optionally, a protective foil or coating may be applied to the metallised surface relief grating.

The following exemplary embodiments of the method of the present invention are illustrated with reference to Examples 1 to 8 below. In each case, the method of the present invention produces high-quality metallised optical element. Exemplary optical elements may comprise diffractive, nano or micro structured surfaces, holographic and/or otherwise surfaces, which provide structural colour surfaces whilst using a fast and efficient production method. Additionally or alternatively these metal surfaces may also exhibit highly retro reflective and reflective properties.

EXAMPLE 1

0.4 ml of Cabot ink CMI 300 (Cabot Corp. USA), a stabilized silver nano particle based ink was mixed with 0.2 ml of Dowanol methyl Carbitol®. The mixture was inkjet printed using a Dimatix 2831 with a 10 pL printing head at 20 micron drop spacing onto an open holographic nano-structure made from a UV resin, prepared by the HoloPrint® method on an OPP film substrate. The printed specimen is transparent and slightly yellow in appearance. The printed specimen was cured in an oven at 130° C. for 5 mins. The resultant sample is showing a bright and highly reflective metallised hologram looking down into the open holographic structure, showing diffraction from the original structure significantly amplified in reflection intensity. With backlighting, the printed image appears deep blue which together with the aforementioned observations show a conformal, continuous and homogenous silver film of app. 30-50 nm in thickness over the surface hologram.

EXAMPLE 2

0.8 ml of Liquid X (Liquid X printed metals Inc, USA) and 0.4 ml Dowanol methyl carbitole was mixed. The mixture was inkjet printed using a Dimatix 2831 with a 10 pL printing head at 20 micron drop spacing onto a an open holographic nano-structure made from a UV resin, prepared by the HoloPrint® method on an OPP film substrate. The printed specimen is transparent and shows no appreciable colour in appearance. The printed specimen was cured in an oven at 130° C. for 5 mins. The resultant sample is showing a bright and highly reflective metallised hologram, showing diffraction from the original structure, significantly amplified in reflection intensity. With backlighting, the printed image has a green hue.

EXAMPLE 3

0.8 ml of Inktec CO-011 ink (Inktec, Korea) was mixed with 0.4 ml Dowanol methyl carbitole. The mixture was inkjet printed using a Dimatix 2831 with a 10 pL printing head at 20 micron drop spacing onto a an open holographic nano-structure made from a UV resin, prepared by the HoloPrint® method on an OPP film substrate. The printed specimen is transparent and shows no appreciable color in appearance. The printed specimen was cured in an oven at 130° C. for 5 mins. The resultant sample is showing a bright and highly reflective metallised hologram, showing diffraction from the original structure, significantly amplified in reflection intensity.

EXAMPLE 4

An open holographic nano-structure made from a UV resin, prepared by the HoloPrint® method on an OPP film substrate was coated with a nano particle silver ink, Sicrys I50T-13 (PVnanoCell, Israel), D50=70 nm with a 4 micron k-bar. The sample was cured at 130° C. for 5 minutes. The substrate film was weighed before and after revealing an approximate average layer thickness of 100 nm of silver. The resultant sample showed no diffraction looking down into the coated open surface relief. However, looking through the substrate holding the hologram, diffraction from the original structure was seen, amplified in reflection intensity.

EXAMPLE 5

An open holographic nano-structure made from a UV resin, prepared by the HoloPrint® method on an OPP film substrate was coated with a mixture of 66 mg nano particle silver ink, Sicrys I50T-13 (PVnanoCell, Israel) and 57 mg Dowanol DPnB applied with a 4 micron k-bar. The sample was cured at 130° C. for 5 minutes. Based on calculation the average silver layer thickness is app. 50 nm. The resultant sample showed some diffraction looking down into the coated open surface relief, but less than for a non-coated reference. However, looking through the substrate holding the hologram, diffraction from the original structure was seen, substantially amplified in reflection intensity.

EXAMPLE 6

A multicomponent ink containing 5-95% (volume) of Inktec TEC-PR-010 ink (Inktec, Korea) and 5-95% (volume) of a solvent or solvent mixture. A layer of this metal containing solution was inkjet printed with a with a Polaris PQ-512 onto an open holographic nano-structure made from a UV resin, prepared by the HoloPrint® method on a PET film substrate. The ink was cured at 160° C. for 10 minutes yielding a bright and very reflective metal layer displaying a significant increase in the diffraction of the original relief structure as well as a substantial amplification of the structure's reflection intensity.

EXAMPLE 7

Using a multicomponent ink containing 5-95% (volume) of Inktec TEC-CO-011 ink (Inktec, Korea) and 5-95% (volume) of a solvent itself containing one or more components. A layer of this metal containing solution was applied to an open holographic nano-structure made from a UV resin, prepared by the HoloPrint® method on a PET film substrate. The metal ink was a deposited on the structure using a Polaris PQ-512 inkjet printhead. The liquid ink layer was cured at 160° C. for 10 minutes yielding a bright and very reflective metal layer displaying a significant increase in the diffraction of the original relief structure as well as a substantial amplification of the structure's reflection intensity.

EXAMPLE 8

An open holographic nano-structure made from a UV resin, prepared by the HoloPrint® method on an OPP film substrate was coated with a nano particle silver ink, Sicrys 150T-13 (PVnanoCell, Israel), D50=70 nm with a 4 micron k-bar.
A film of metal in is applied to the substrate with an holographic nano-structure made from a UV resin, prepared by the HoloPrint® method on a PET film substrate, the wet metal film is then cured by photolysis with an Adphos MPP-120 lamp, Adphos Group Germany, for between 50 and 100% for 0.001 to 2 seconds. The curing yielded a bright and very reflective metal layer displaying a significant increase in the diffraction of the original relief structure as well as a substantial amplification of the structure's reflection intensity.

Figure 5:
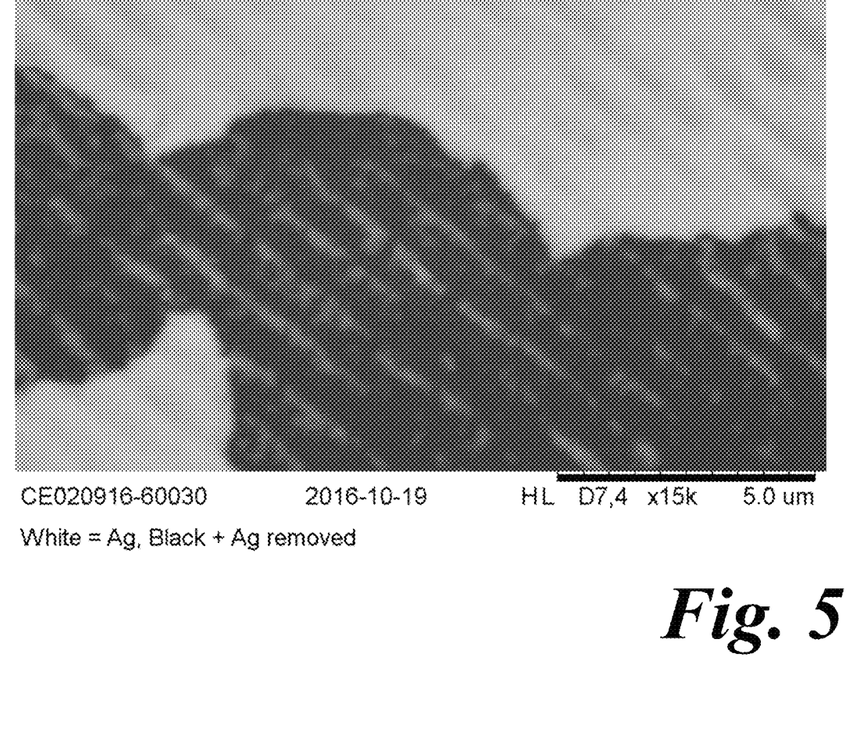
FIG. 5 shows a scanning electron microscope (SEM) of an optical element comprising a metallised surface relief structure formed in accordance with an embodiment of the invention.

The benefits of the method of the present invention can be seen in FIG. 5. FIG. 5 shows a scanning electron microscop (SEM) picture of a Ag-metallised diffraction grating. The grating has a groove density of approximately 1400 lines/mm. The grating been replicated on a PET foil using the HoloPrint® technology. The replica is made using an X-29 photocurable acrylate-based resin from Stensborg A/S.

A surface relief metal layer obtained using CO-011 is shown. The silver metal layer sits on top of the surface relief as a conformal coating. Where the silver layer is absent, this layer was removed by a super soft high tack tape. As shown, the entire surface has an even, smooth and well-distributed metallic layer.

The following examples do not fall within the scope of the present invention and are provided to illustrate the improvement of the method of the present invention over known methods.

EXAMPLE 9

An open holographic nano-structure made from a UV resin, prepared by the HoloPrint® method on an OPP film substrate was coated with 3 different metallic gravure inks Eckhart, Germany—Ultrastar GX2561, Ultrastar FX-1604 and Ultrastar GX-2807 with a 4 micron k-bar. The metallic component is aluminium flakes on the order of 6-8 micron in dimension and with thickness below 100 nm. Samples were dried at 70° C. for 2 minutes. For all samples, there is a no enhancement of the diffraction efficiency from the original structure looking down into the open surface relief structure but slight enhancement viewing through the substrate that holds said surface relief structure. In both instances, effects are substantially below the significantly amplified reflection intensity seen in examples 1-3.

EXAMPLE 10

An open holographic nano-structure made from a UV resin, prepared by the HoloPrint® method on a PET film substrate was written upon with a Circuit Scribe Conductive Ink Pen 1 Ω/cm from Electroninks USA. For all samples it was not possible to discern the features of the original relief structure when looking directly down the open surface or at any angle from above. Holding the sample up towards a light source and looking at the reverse of the relief structure through the substrate no enhancement of the hologram was observed.

As discussed above, the present invention provides a method for on demand in-line printing or coating a metal containing ink, and dry said ink, to create a metallic optical element having a nano-size structure such as a surface relief diffractive structure for enhancement of the phase modulation.

As such, the present invention enables a substantially new process for cost effective full or partial, in-register, in-line print manufacturing of metallised nano- and micro structures. Such metallised nano- and microstructures could e.g. be for retro-reflective purposes and spectrographic use. Wavelength demultiplexing components for use in telecomunication applications is yet another example of optical components that could be fabricated using said metallizing process.

Furthermore, the ability to apply metallic nano-coatings on demand by ink-jet to a polymer substrate opens up the possibility of creating layers with plasmonic properties. Such plasmonic layers have been shown to control light emitted by solid state emitters, e.g., direction and polarization as well as enhancing the light coupling efficiency of solar cells. Surface plasmons have also been found useful in creating structural colours either by themselves or in combination with diffractive structures. Using the methods described in this patent application, structures with the abovementioned properties can be made in an in-line process without the need for costly off-line vacuum deposition equipment.

Another application of applying metallic nano-coating on demand by ink-jet is optical biosensors based on monolithic optical waveguides. Such waveguides normally require the use of refractory materials like $TiO_2$, $HfO_2$, $ZrO_2$, $Ta_2O_5$ and ZnS just to mention a few. All these substances typically have index of refraction in the region 2.0-2.3. This is typically the refractive range required for the waveguide to operate in contact with biological samples typically with a high water content. Using the proposed metallic nano-coating, the use of these materials, typically requiring costly off-line processes, can be achieved in an in-line process facilitating the fabrication of disposable optical biosensors. Another aspect of using a metallic nano-coatings on optical waveguides for evanescent field based sensing, is the ease at which suitable layers for molecular pattern recognition (affinity reactions) can be immobilised to said layer.

The present invention can be used widely within areas of holographic printing, holographic embossing, optical sensors, solar cells, TFT-LCDs, OLED's, flexible displays etc. Those skilled in the art will appreciate that the conception and specific embodiments disclosed in the foregoing description may be readily utilized as a basis for modifying or designing other embodiments for carrying out the same purposes of the present invention. Those skilled in the art will also appreciate that such equivalent embodiments do not depart from the spirit and scope of this invention as set forth in the appended claims.

Embodiments of the present invention have been described with particular reference to the examples illustrated. While specific examples are shown in the drawings and are herein described in detail, it should be understood, however, that the drawings and detailed description are not intended to limit the invention to the particular form disclosed. It will be appreciated that variations and modifications may be made to the examples described within the scope of the present invention.

The invention claimed is:
1. A method comprising:
   forming a metallic structure on an optical element comprising a surface relief structure, by printing or coating a metal-containing ink onto said surface relief structure,
   wherein the metal-containing ink comprises an organic solvent, and a metal-containing component selected from the group consisting of a homogeneously soluble metal salt, a metal complex, and combinations thereof;
   wherein printing or coating the metal containing ink on to said surface relief structure comprises one or more of: inline printing, on demand printing, in-register printing, dispensing, inkjet printing, aerosol jet, offset printing, screen printing, pad printing, gravure printing, flexography, stencil printing, imprinting, xerography or lithography.
2. A method according to claim 1, wherein the metal-containing component comprises a metal ion, wherein the metal ion is selected from the group of: silver, gold, copper, ruthenium, osmium, iridium, and platinum.

3. A method according to claim 1, wherein the solvent is selected from the group consisting of: alcohols, esters, ketones, glycol ethers and phenol ethers.
4. A method according to claim 1, wherein the solvent has a surface tension less than or equal to 25 dyn/cm (0.025 N/m).
5. A method according to claim 1, wherein the solvent has a surface tension greater than or equal to 30 dyn/cm (0.03 N/m).
6. A method according to claim 1, wherein said metallic structure has a size in one or more dimensions between 10 and 500 nm.
7. A method according to claim 1, wherein the surface relief structure comprises a surface structure defining a plurality of peaks and troughs, and wherein the metallic structure completely covers the peaks of said surface relief structure and completely fills the troughs therebetween.
8. A method according to claim 1, wherein the surface relief structure comprises a surface structure defining a plurality of peaks and troughs, and wherein the metallic structure defines a conformal coating on the peaks and troughs of said surface relief structure.
9. A method according to claim 1, wherein the surface relief structure is partially metallised to define a partially metallised structure having a same pitch as said surface relief structure.
10. A method according to claim 1, further comprising applying a coating or a foil to the metallic structure.
11. A method according to claim 1, wherein the optical element comprises one or more of: a diffractive surface relief structure, a holographic surface relief structure, a retro-reflective surface relief structure, or a plasmonic surface relief structure.
12. A method according to claim 1, wherein the optical element comprises an optoelectronic device.
13. A method comprising:
   forming a metallic structure on an optical element comprising a surface relief structure, by applying a metal-containing ink to said surface relief structure,
   wherein the metal-containing ink comprises an organic solvent, and a metal-containing component selected from the group consisting of a homogeneously soluble metal salt, a metal complex, and combinations thereof,
   wherein said metallic structure has an optical density ≥1.
14. A method according to claim 13, wherein the metal-containing component comprises a metal ion, wherein the metal ion is selected from the group of: silver, gold, copper, ruthenium, osmium, iridium, and platinum.
15. A method according to claim 13, wherein the solvent is selected from the group consisting of: alcohols, esters, ketones, glycol ethers and phenol ethers.
16. A method comprising:
   forming a metallic structure on an optical element comprising a surface relief structure, by applying a metal-containing ink to said surface relief structure, wherein the metal-containing ink comprises an organic solvent, and a metal-containing component selected from the group consisting of a homogeneously soluble metal salt, a metal complex, and combinations thereof; and
   drying said metal-containing ink at a temperature in a range of 80-300° C.
17. A method according to claim 16, wherein drying said metal-containing ink is performed at a temperature in a range of 120-180° C.

18. A method according to claim 16, wherein the solvent is selected from the group consisting of: alcohols, esters, ketones, glycol ethers and phenol ethers.

19. A method according to claim 16, wherein the surface relief structure comprises a surface structure defining a plurality of peaks and troughs, and wherein the metallic structure completely covers the peaks of said surface relief structure and completely fills the troughs therebetween or the metallic structure defines a conformal coating on the peaks and troughs of said surface relief structure.

20. A method comprising:
  forming a metallic structure on an optical element comprising a surface relief structure, by applying a metal-containing ink to said surface relief structure, wherein the metal-containing ink comprises an organic solvent, and a metal-containing component selected from the group consisting of a homogeneously soluble metal salt, a metal complex, and combinations thereof; wherein the optical element is operable to produce structural colour.

* * * * *